United States Patent
Scurto (10) Patent No.: US 9,359,761 B2
(45) Date of Patent: Jun. 7, 2016

(54) JOINT FILLING STRIP

(71) Applicant: Ductilcrete Slab Systems, LLC, Gilberts, IL (US)

(72) Inventor: Gregory M Scurto, Naples, FL (US)

(73) Assignee: DUCTILCRETE SLAB SYSTEMS, LLC, Gilberts, IL (US)

( * ) Notice: Subject to any disclaimer, the term of this patent is extended or adjusted under 35 U.S.C. 154(b) by 0 days.

(21) Appl. No.: 14/625,151

(22) Filed: Feb. 18, 2015

(65) Prior Publication Data

US 2015/0240503 A1 Aug. 27, 2015

Related U.S. Application Data

(60) Provisional application No. 61/943,314, filed on Feb. 22, 2014.

(51) Int. Cl.
| | |
|---|---|
| *E04F 15/14* | (2006.01) |
| *E04B 5/32* | (2006.01) |
| *C04B 28/04* | (2006.01) |
| *E04B 1/68* | (2006.01) |
| *E04C 5/01* | (2006.01) |
| *E04F 15/12* | (2006.01) |

(52) U.S. Cl.
CPC . *E04B 5/32* (2013.01); *C04B 28/04* (2013.01); *E04B 1/6801* (2013.01); *E04B 1/6804* (2013.01); *E04B 1/6812* (2013.01); *E04C 5/012* (2013.01); *E04F 15/12* (2013.01); *E04F 15/142* (2013.01)

(58) Field of Classification Search
CPC ........ E04F 15/14; E04F 15/142; E04C 5/073; E04B 1/6801; E04B 1/6804; E04B 1/6813; E04B 5/32; E01C 11/10; E01C 23/026; C04B 16/06

USPC ............ 52/318, 396.04, 396.07, 414; 404/64, 404/65; 277/644, 645, 648, 649, 906, 921

See application file for complete search history.

(56) References Cited

U.S. PATENT DOCUMENTS

| | | | | | |
|---|---|---|---|---|---|
| 2,156,681 | A | * | 5/1939 | Dewhirst | E01C 11/106 277/649 |
| 3,080,950 | A | * | 3/1963 | Greene | E06B 3/44 49/176 |
| 3,162,906 | A | * | 12/1964 | Dudley | E04F 19/06 52/396.04 |
| 3,180,238 | A | * | 4/1965 | Crone | E01C 11/10 404/48 |
| 3,286,425 | A | * | 11/1966 | Brown | E04B 1/6815 404/64 |
| 3,575,094 | A | * | 4/1971 | Hewitt | E04F 15/14 404/65 |
| 3,871,787 | A | * | 3/1975 | Stegmeier | E04B 1/6804 404/48 |
| 3,896,597 | A | * | 7/1975 | Deason | E04B 1/6803 404/64 |

(Continued)

FOREIGN PATENT DOCUMENTS

| | | | | | |
|---|---|---|---|---|---|
| FR | 2629845 | | * | 10/1989 | |
| GB | 504570 | A | * | 4/1939 | ............. E01C 11/14 |
| JP | 2849716 | B2 | * | 1/1999 | |

OTHER PUBLICATIONS

"What Is Durometer?", 1 page, © 2012 FreelinWade.*

*Primary Examiner* — Robert Canfield
(74) *Attorney, Agent, or Firm* — Peter J. Van Bergen (57) ABSTRACT

A joint filling strip has a uniform cross-section along its length that defines a top portion and a shaft portion coupled to the top portion. The top portion includes a rectangular section. The shaft portion includes at least one pair of opposing fins spanning a distance that is greater than a width of the rectangular section.

11 Claims, 6 Drawing Sheets

(56) References Cited

U.S. PATENT DOCUMENTS

| | | | | | |
|---|---|---|---|---|---|
| 4,362,427 | A * | 12/1982 | Mass | E01C 11/126 404/64 |
| 4,548,009 | A * | 10/1985 | Dahowski | E01C 23/026 404/48 |
| 4,889,445 | A * | 12/1989 | Vittone | E01C 23/026 404/64 |
| 4,906,129 | A * | 3/1990 | Stegmeier | E04F 15/14 404/64 |
| 5,375,386 | A * | 12/1994 | Goad | E01C 11/106 404/69 |
| 6,219,982 | B1 * | 4/2001 | Eyring | E04B 1/6803 52/393 |
| 6,802,513 | B2 * | 10/2004 | Ranzau | F16J 15/025 277/641 |
| 7,797,899 | B2 * | 9/2010 | Linn | E04B 1/6804 52/273 |
| 8,132,380 | B2 * | 3/2012 | Wilkes, Jr. | E04B 1/6812 52/393 |
| 8,276,918 | B1 * | 10/2012 | Gilstad | F04B 1/0448 277/530 |
| 8,955,287 | B2 * | 2/2015 | Fortney | E01C 11/106 52/396.04 |
| 2004/0055235 | A1 * | 3/2004 | Valentine | E01C 11/106 52/396.02 |
| 2008/0115440 | A1 * | 5/2008 | Fortney | E01C 11/106 52/393 |
| 2009/0145070 | A1 * | 6/2009 | Linn | E04B 1/6804 52/465 |
| 2010/0095620 | A1 * | 4/2010 | Wilkes, Jr. | E04B 1/6813 52/396.04 |

\* cited by examiner

JOINT FILLING STRIP

Pursuant to 35 U.S.C. §119, the benefit of priority from provisional application 61/943,314, with a filing date of Feb. 22, 2014, is claimed for this non-provisional application.

CROSS-REFERENCE TO RELATED PATENT APPLICATIONS

This patent application is co-pending with one related patent application entitled "CONCRETE FLOOR SYSTEM USING INTEGRATED CONCRETE SLAB AND JOINT FILLING STRIPS", filed on the same date and owned by the same assignee as this patent application.

FIELD OF THE INVENTION

The invention relates generally to filling construction joints, and more particularly to a joint filling strip.

BACKGROUND OF THE INVENTION

Under normal drying conditions, concrete (e.g., Portland cement concrete with or without pozzolans mixed therein) will shrink from the exposed surfaces inward as it desiccates and hardens. The amount of drying shrinkage typically ranges between approximately 0.0002 to approximately 0.0008 inches per inch with approximately 0.0005 inches per inch being the norm. Significantly, the drying shrinkage does not occur through the full depth of the concrete, but is rather rapidly attenuated to insignificance only a few inches from the exposed surfaces. Since the top is typically the only surface of a concrete slab exposed to drying, it is normal for a downwardly decreasing shrinkage gradient to develop within the uppermost few inches of a slab. As a result of such shrinkage gradient, the top region of a concrete slab tends to "curl" (i.e., develop an upward facing concave curvature) as it dries. This is not a desirable condition, since a measure of quality in a concrete slab is its surface flatness.

The problems associated with curling concrete slabs are exacerbated at concrete "joints" formed at sawcuts. Such sawcuts are made at the surface of a slab to control cracking within the slab, or are made at the surface of two adjacent slabs. Specifically, a sawcut's surface edges are subject to spalling as traffic moves over slab joints.

SUMMARY OF THE INVENTION

Accordingly, it is an object of the present invention to provide an apparatus for filling construction joints such as those found in concrete floors.

Another object of the present invention is to provide a joint filling strip that reduces/eliminates spalling at sawcuts in a concrete floor.

Still another object of the present invention is to provide a joint filling strip that facilitates a neat and efficient joint filling process.

Other objects and advantages of the present invention will become more obvious hereinafter in the specification and drawings.

In accordance with the present invention, a joint filling strip is made from flexible-material and has a uniform cross-section along its length. The uniform cross-section defines a top portion and a shaft portion coupled to the top portion. The top portion includes a rectangular section. The shaft portion includes at least one pair of opposing fins spanning a distance that is greater than a width of the rectangular section.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention is joint filling strip that can be used to fill elongated and open construction joints between a variety of materials to include concrete, metal, wood, etc. By way of example, the present invention will be explained with respect to its use in a concrete floor system employing integrated concrete slabs where the joint filling strips are inserted into surface sawcuts made in the slabs for crack control and surface sawcuts made at the junctures of two adjacent slabs. The integrated concrete slabs described herein exhibit little or no curl, and have been described in U.S. Pat. No. 7,968,178, the contents of which are hereby incorporated by reference. For a complete understanding of the present invention, these integrated concrete slabs will be described in detail below.

Figure 1:
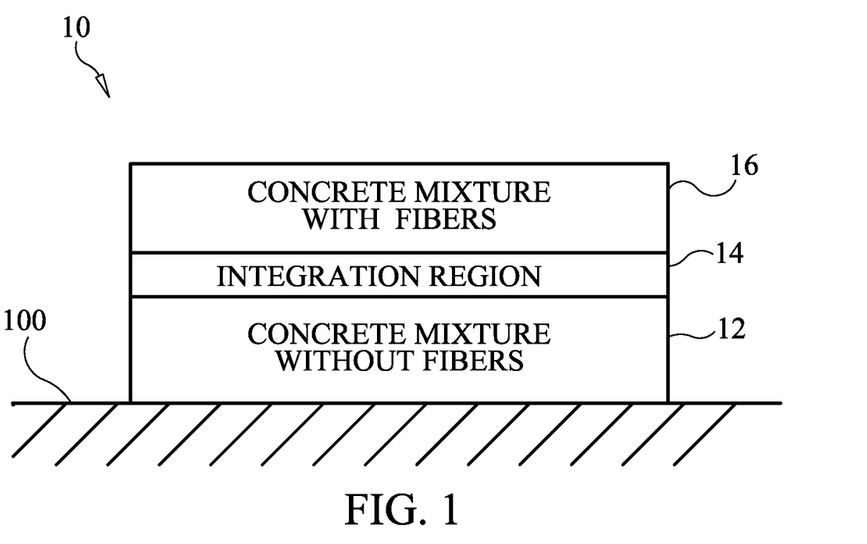
FIG. 1 is a schematic view of a cross-section of an integrated concrete slab used in an exemplary concrete floor system.

Referring now to the drawings and more particularly to FIG. 1, an integrated concrete slab used in the concrete floor system of the present invention is shown and is referenced generally by numeral 10. While the illustration of concrete slab 10 will facilitate an understanding of the novelty of the concrete slab, it is to be understood that the illustrated dimensions (i.e., both literally and in relative terms) of concrete slab 10 are not meant to represent a scale version of a real concrete slab. Further, the rectangular cross-sectional shape of concrete slab 10 is merely used for illustrative purposes and does not represent a limitation of the present invention.

Concrete slab 10 will typically rest on an earthen, engineered stone, or engineered structural base 100. However, the particular nature of base 100 is not a limitation of the present invention. The only requirement of base 100 is that it provides sufficiently firm support for concrete slab 10 as would be understood in the art.

Moving upward from base 100, concrete slab 10 is generally defined by a concrete mixture 12 containing either no fibers or a relatively small quantity of fibers, an integration region 14, and a concrete mixture 16 containing enough stretchable fibers to decrease the mixture's elastic modulus significantly upon hardening. As will be explained further below, since the inclusion of a low dosage of fibers or other benign fillers in mixture 12 will not improve the performance of the present invention, such fibers/fillers will not typically be included in mixture 12. Accordingly, the illustrated embodiment will refer to mixture 12 as having no fibers mixed therein.

Concrete mixtures 12 and 16 are both typically Portland cement concretes with or without pozzolans (e.g., filler materials having behavioral properties similar to that of cement) mixed therein. As just mentioned, concrete mixture 12 will typically have no fibers mixed therein. However, if fibers are included in concrete mixture 12, they may be of any size and type (e.g., metal, synthetic, or natural). Note that since such fibers will typically increase cost and will provide no appreciable benefit (as they are below the shrinking upper portion of the slab), their inclusion in concrete mixture 12 is generally unnecessary.

Unlike concrete mixture 12, concrete mixture 16 includes a large quantity of stretchable fibers to decrease the elastic modulus of concrete mixture 16 when it hardens. Approximately 3-9 pounds of stretchable fibers should be mixed into each cubic yard of mixture 16 so that it will be flexible enough after setting to eliminate curl of concrete slab 10. For example, the fibers could be polymer macrofibers that range in length from approximately 0.5 inches to approximately 2.5 inches. The fibers could be all the same length or different lengths without departing from the scope of the present invention. The various means for mixing the fibers into concrete mixture 16 are well understood in the art.

Coupling mixtures 12 and 16 is integration region 14 that allows mixtures 12 and 16 to function cooperatively and thereby define integrated concrete slab 10. Integration region 14 is defined when concrete mixture 16 is placed on concrete mixture 12 as will be explained later herein. In terms of the structure of concrete slab 10, integration region 14 is formed by intermixing some of mixture 16 and some of mixture 12. More specifically, with at least the top region of mixture 12 in a plastic state (i.e., also referred to in the art as the state where concrete is said to be "alive"), an integration between this top region of mixture 12 and the bottom region of mixture 16 in its plastic state occurs when the two come into contact with one another. The resulting integration region 14 is thereby defined when the top region of mixture 12 is in its plastic state and when the bottom region of mixture 16 is in its plastic state, i.e, when mixture 16 is placed. Integration region 14 retains its integrating attributes throughout the setting and hardening of concrete slab 10 as well as the entire useful life of concrete slab 10.

The above-recited construction of concrete slab 10 reduces curl that ultimately affects the flatness of the exposed surface of concrete slab 10. That is, upon hardening, concrete slab 10 provides a reduced modulus of elasticity in mixture 16 owing to the stretchable nature of the fibers contained therein. The following three conditions contribute to this result:

shrinkage of concrete slab 10 only occurs within the top several (vertical) inches thereof regardless of its overall (vertical) thickness, mixture 16 occupies this isolated upper shrinking region, and mixture 16 (by virtue of its high stretchable fiber content) exhibits a much lower than normal elastic modulus upon hardening. As a result, when mixture 16 shrinks, rather than being stiff enough to lift and bend mixture 12 (which is not shrinking) off base 100 (and thus cause concrete slab 10 to curl), it instead stretches sufficiently to allow mixture 12 to remain substantially in contact with base 100. That is, the addition of stretchable fibers in mixture 16 reduces its ability to pull up the non-shrinking portion of concrete slab 10 to reduce curl at the exposed surface of concrete slab 10. Accordingly, curl is minimized when the thickness of mixture 16 is selected such that the shrinkage of integration region 14 is minimized as concrete slab 10 hardens. This result can be achieved for the vast majority of concrete slabs if approximately 2-3 inches of mixture 16 is placed during fabrication. Since the inclusion of stretchable fibers is only required in a portion of concrete slab 10, the present invention provides a cost-effective approach for producing concrete slabs having little or no curl.

Figure 2:
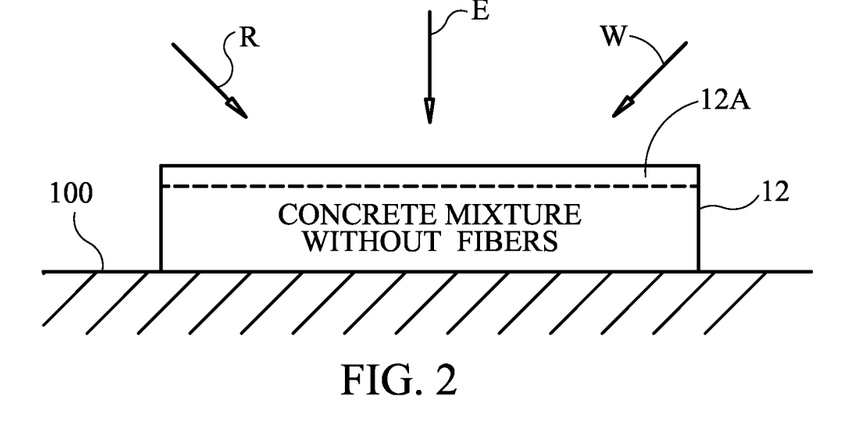
FIG. 2 is a schematic view of a non-fiber concrete mixture after placement on a base in accordance with a method of fabricating the integrated concrete slab.
Figure 3:
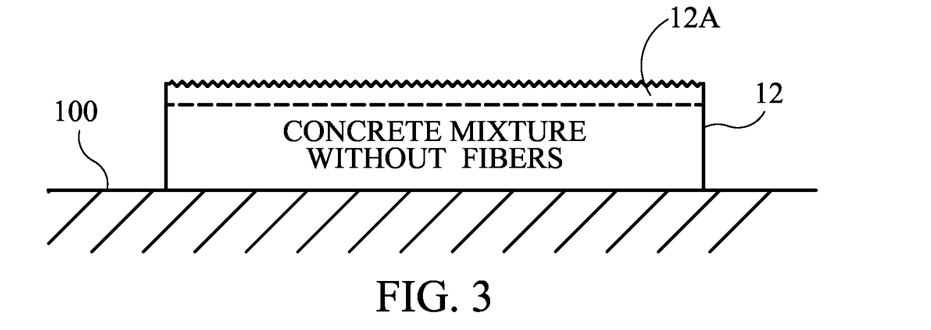
FIG. 3 is a schematic view of the non-fiber concrete mixture with its top region in a plastic state and roughened in accordance with an embodiment of the integrated concrete slab.

The method of fabricating integrated concrete slab 10 will now be explained using the sequence of schematic illustrations in FIGS. 2-4 that depict a typical fabrication sequence. In FIG. 2, concrete mixture 12 is placed on base 100 in accordance with methodologies well understood in the art. Mixture 12 is configured as described earlier herein, i.e., either no fibers or relatively few fibers are mixed therein. While the particular vertical thickness of mixture 12 on base 100 is not a limitation of the present invention, it will typically be more than two inches thick.

Using procedures well-known in the art, mixture 12 can be the recipient of activities designed to make mixture 12 set from its bottom. That is, the various activities are designed such that the last portion of mixture 12 that is allowed to set is its top region 12A. Until it is set, mixture 12 is said to be "alive" or in its plastic state, i.e., deformable but not capable of rebounding to a pre-deformed state. In accordance with the present invention, it is critical that, at a minimum, top region 12A of mixture 12 remain in its plastic state during fabrication of the present invention's integrated concrete slab. This can be achieved passively by monitoring the state of top region 12A, or actively by (i) applying a retardant (e.g., a solution of sugar and water) to top region 12A as indicated by the arrow referenced by the letter "R", (ii) wetting top region 12A with water as indicated by the arrow referenced by the letter "W", or (iii) applying an evaporation inhibitor (e.g., cetyl alcohol) to top region 12A as indicated by the arrow referenced by the letter "E".

While top region 12A is plastic, it may also be desirable to roughen (e.g., via raking, rough troweling, etc.) top region 12A to prepare it for receipt of mixture 16. Accordingly, FIG. 3 illustrates the exposed surface of top region 12A as being irregular after the roughening thereof. Since such roughening will typically require workers (not shown) to stand/walk on mixture 12, the roughening process will typically not occur until the portion of mixture 12 beneath top region 12A has set such that workers will not sink into mixture 12 beyond top region 12A.

Figure 4:
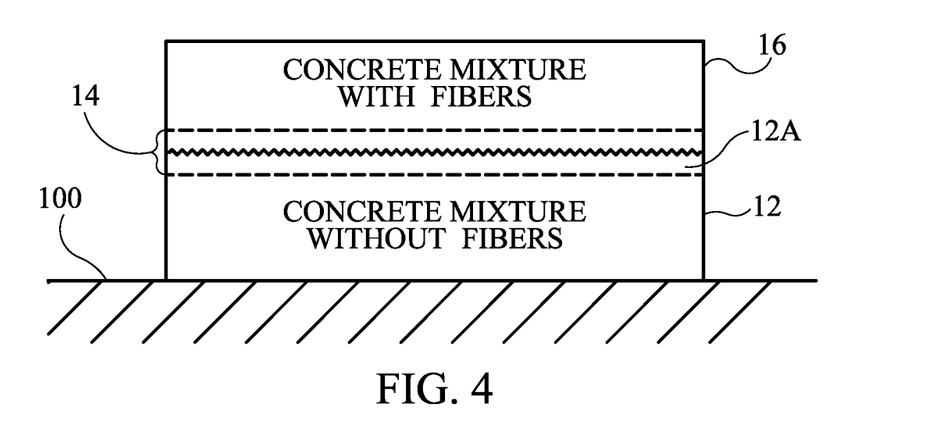
FIG. 4 is a schematic view of the non-fiber concrete mixture with its top region in a plastic state and roughened, and further having a plastic stretchable-fiber-inclusive concrete mixture placed thereon.

Following placement of mixture 12 and while top region 12A is in its plastic state and has optionally been roughened as just described, mixture 16 is placed on mixture 12 as shown in FIG. 4. Mixture 16 is configured as described earlier herein, i.e., stretchable fibers are mixed therein. Since mixture 16 is in its plastic state when it is placed and top region 12A is in its plastic state as described above, integration between the lower portion of mixture 16 and top region 12A begins upon contact therebetween, and can be further enhanced by the typical succession of routine mechanical concrete finishing processes (e.g., screeding, vibrating, troweling, etc.) as these tend to further compress mixture 16 while it is plastic. As a result, integration region 14 is defined as indicated in FIG. 4 by the region between the two horizontally-oriented dashed lines. After mixture 16 has been placed, finishing of the top surface thereof can proceed with a variety of processing steps well known in the art of concrete construction.

The above-described integrated concrete slab resists curling during the hardening thereof as the stretchable fibers reduce the modulus of elasticity of the shrinking portion of the slab while the shrinking portion is integrated with the non-shrinking portion of the slab. Since the inclusion of the stretchable fibers is only required in that fraction of the overall slab where they will provide benefit, the cost associated with the use of such fibers is minimized.

Figure 5:
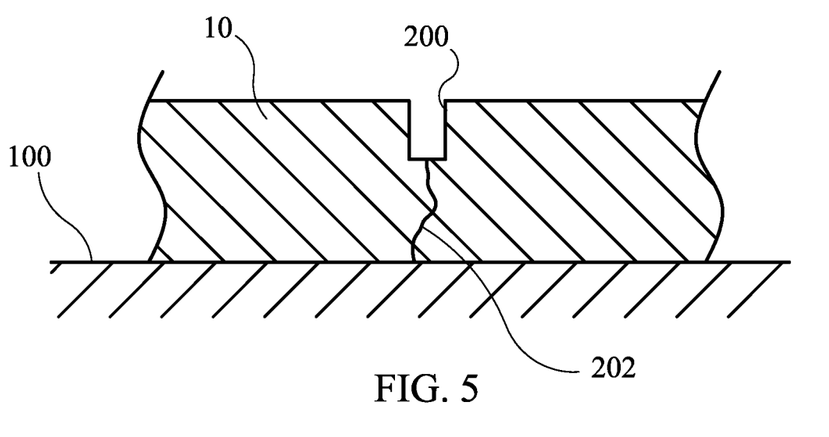
FIG. 5 is a cross-sectional view of a portion of an integrated concrete slab with a surface sawcut formed therein for purpose of inducing a hairline crack within the concrete slab.
Figure 6:
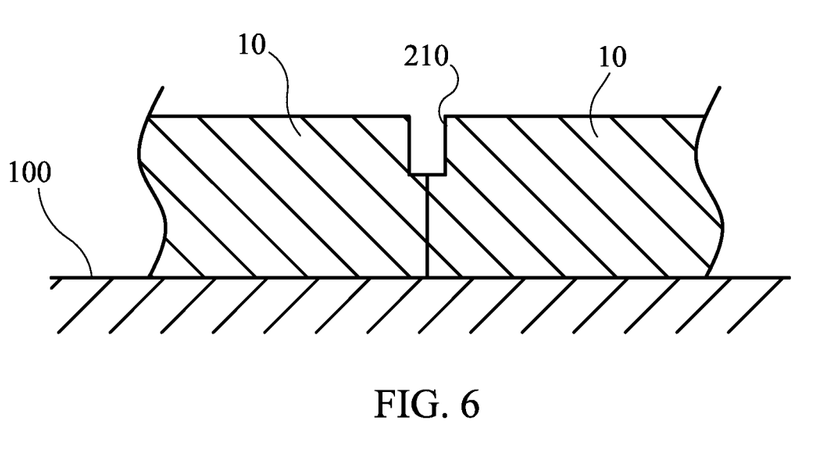
FIG. 6 is a cross-sectional view of two adjacent integrated concrete slabs with a surface sawcut formed where the two slabs meet.

As mentioned above, surface sawcuts (or "joints" as they are also referred to in the art) are an integral part of concrete floor manufacturing and the ultimate concrete floor system. For example, FIG. 5 illustrates a sawcut 200 made in the exposed top surface of an integrated slab 10 to initiate an underlying hairline crack 202 to thereby reduce/eliminate such cracks at the surface of the integrated slab 10. Referring to FIG. 6, a sawcut 210 made in a floor's top surface where two adjacent integrated slabs meet provides a clean joint at the surface of the adjacent integrated slabs 10. Sawcuts 200 and 210 are typically made any time after slab 10 can support early entry saw cutting as is known in the art. It is desirable to fill either of sawcuts 200 and 210 to prevent spalling at the edges of the sawcut. The depth of each sawcut is generally about one-quarter of the slab's thickness as is known in the art. The width of each sawcut is generally commensurate with the width of the saw blade used to make the sawcut.

When building a concrete floor system using the above-described integrated slabs that exhibit little or no curl, the edges of the sawcut at the slab/floor's exposed surface will be level (or virtually level) with the exposed surface. This means that the opposing (vertical) walls of the sawcut are essentially parallel to one another owing to the parallel faces of a sawblade (not shown) used to create the sawcut.

To prevent spalling at the top edges of sawcut 200 or sawcut 210, the sawcuts must be filled. In accordance with the present invention, a pre-made strip of uniform cross-section along its length is pressed into the sawcuts. The strip will be cut to a desired length from a continuous (roll) thereof. The strip can be made from a flexible plastic material (e.g., polyvinyl chloride or PVC, or any other suitable polymer) with a durometer measure in the range of approximately 70 to approximately 100.

Figure 7:
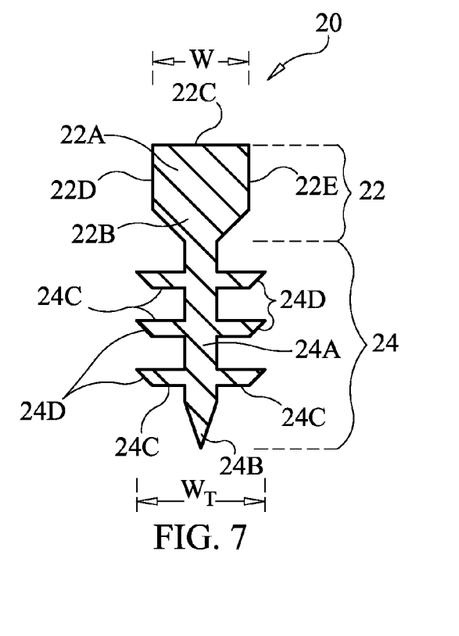
FIG. 7 is a cross-sectional view of an embodiment of a joint filling strip of the present invention in its pre-use state.
Figure 8:
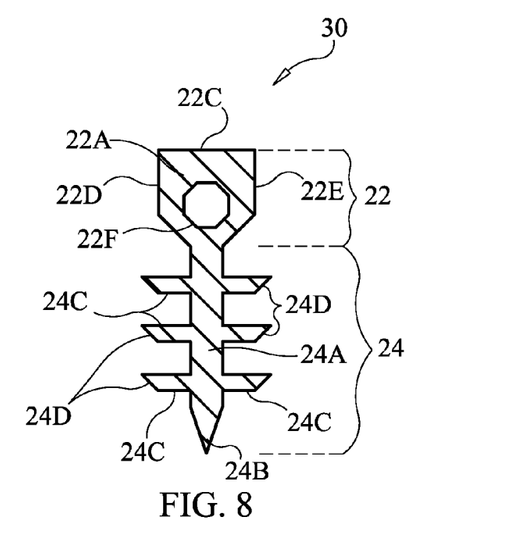
FIG. 8 is a cross-sectional view of another embodiment of a joint filling strip in its pre-use state.
Figure 9:
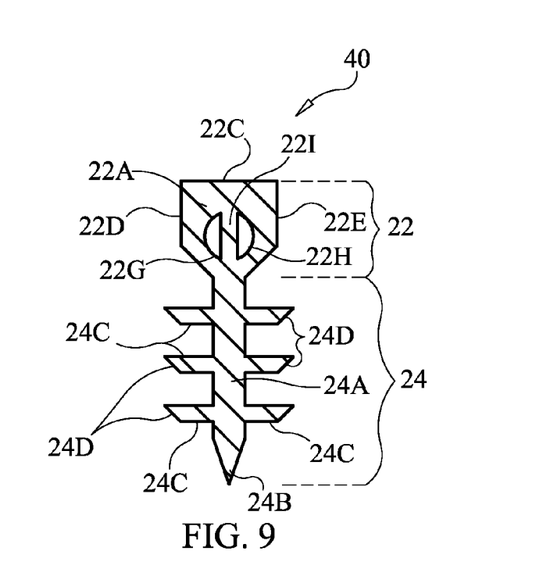
FIG. 9 is a cross-sectional view of another embodiment of a joint filling strip in its pre-use state.

Three exemplary cross-sectional shapes for the joint filling strip of the present invention are shown in their pre-use states (i.e., prior to being inserted into a sawcut) in FIGS. 7-9. Each strip is an elongate structure that can be cut to a desired length to fill a sawcut. Referring first to FIG. 7, a joint filling strip 20 includes a top or head portion 22 and a shaft portion 24. Strip 20 is a solid monolithic structure that can be extruded and then coiled for ease of handling prior to cutting to a desired length. Top portion 22 has a continuous width portion 22A and a tapered width portion 22B. Constant width portion 22A has a pre-use width "W" that is approximately equal to the width of a sawcut it will be used to fill plus the expected amount of concrete shrinkage. That is, prior to being inserted in a sawcut, width W is slightly greater than the width of a fresh or new sawcut it will be used to fill. Constant width portion 22A is a rectangular structure (e.g., square or rectangle) such that a top 22C is perpendicular to opposing parallel sides 22D/22E of constant width portion 22A. Tapered width portion 22B couples constant width portion 22A to shaft portion 24.

Shaft portion 24 includes a central support 24A aligned with the center of constant width portion 22A and terminated in a tip 24B that can be tapered (as shown), rounded, or blunt. Extending from either side of central support 24A are fins 24C, e.g., three fins 24C are illustrated on each side of central support 24A but one, two, or more than three could be provided on each side of central support 24A without departing from the scope of the present invention. More specifically, fins 24C are provided in opposing, mirror-imaged pairs thereof relative to central support 24A with each fin 24C extending perpendicularly away from central support 24A and terminating in a wedge-shaped tip 24D that extends beyond the width confines of constant width portion 22A. Accordingly, the pre-use tip-to-tip width "$W_T$" of shaft portion 24 is greater than the pre-use width W of constant width portion 22A and greater than the expected width of a sawcut after slab shrinkage has occurred. The angle defined at the outboard point of each wedge-shaped tip 24D is acute so that each corresponding wedge face is angled (downward) towards tapered tip 24B. In the illustrated embodiment, fins 24C are identical in size and shape. However, it is to be understood that fins 24C can be varied in terms of length, thickness, tip shape, etc., without departing from the scope of the present invention.

Referring now to FIGS. 8 and 9, additional embodiments of a joint filling strip are shown in cross-section and are referenced generally by numerals 30 and 40, respectively. The structural elements that are common between strip 20 and each of strips 30 and 40 are referenced with common numerals and will not be described again. Strip 30 is a monolithic structure that can be extruded/coiled/cut just like strip 20, but differs from strip 20 in that it is not completely solid. More specifically, constant width portion 22A incorporates a void or hole 22F therein that extends all along the length of strip 30. Hole 22F can be octagonal (as shown), circular, or any other regular or irregular geometric shape without departing from the scope of the present invention. The purpose of hole 22F will be described further below.

Strip 40 is also a monolithic structure that can be extruded/coiled/cut just like strip 20, but differs from strip 20 in that it is not completely solid. More specifically, constant width portion 22A incorporates two voids/holes 22G and 22H separated from one another by a vertical region 22I that is contiguous with the rest of constant width portion 22A. Holes 22G/22H and vertical region 22I extend all along the length of strip 40. Holes 22G and 22H can be mirror images of one another relative to vertical region 22I, and can be semi-circular (as shown) or any other regular or irregular geometric shape without departing from the scope of the present invention. More than two holes could also be provided all along the length of constant width portion 22A without departing from the scope of the present invention. Vertical region 22I is perpendicular to top 22C and parallel to opposing sides 22D/22E. The purpose of holes 22G/22H and vertical region 22I will be described further below.

Figure 10:
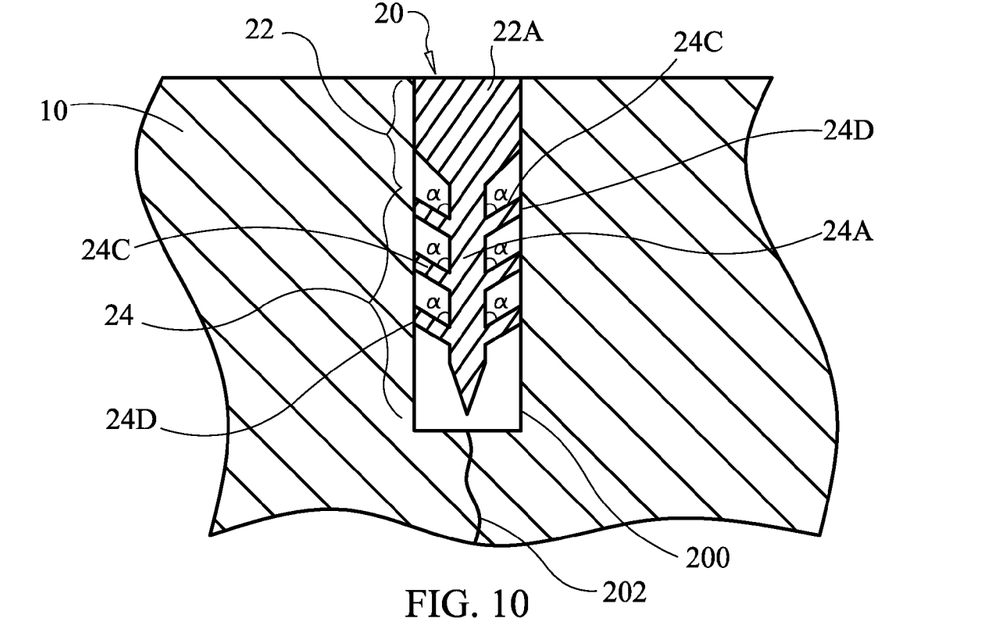
FIG. 10 is a cross-sectional view of a portion of an integrated concrete slab with a surface sawcut filled with the joint filling strip illustrated in FIG. 7.

A portion of a completed concrete floor system in accordance with an embodiment of the present invention is shown in FIG. 10 where integrated concrete slab 10 has sawcut 200 with joint filling strip 20 inserted therein. As shaft portion 24 is driven into a fresh sawcut 200, fins 24C flex up towards head portion 22 as shaft portion 24 fully spans the width of sawcut 200. Strip 20 is continued to be driven into sawcut 200 until top 22C is flush with the exposed top surface of slab 10 to thereby fill the upper portion of sawcut 200. Use of a tapered tip 24B will allow tip 24B to flex in situations where the height of sawcut 200 is less than the overall height of strip 20.

As mentioned above, the width of constant width portion 22A includes the expected amount of shrinkage that will increase the width of sawcut 200. Accordingly, constant width portion 22A is compressed laterally upon insertion into a fresh sawcut 200, and then expands laterally while still fully filling the width of a mature sawcut 200 for slab 10 that has experienced shrinkage. Strip 20 is held/fixed in place in sawcut 200 as fins 24C are flexed upward toward the surface of slab 10 such that the upper angle a formed between central support 24A and each fins 24C is acute. The wedge-shaped tips 24D facilitate the insertion of strip 20 into sawcut 200, and define a friction-based grip surface/interface with the walls of sawcut 200 once the strip is in sawcut 200. Since the pre-use tip-to-tip width $W_T$ (FIG. 7) of shaft portion 24 is greater than the width of constant width portion 22A and that of a sawcut after slab shrinkage, the grip function provided by tips 24D is retained even after slab 10 has undergone shrinkage. That is, shaft portion 24 spans the width of sawcut 200 throughout the life of slab 10.

Figure 11:
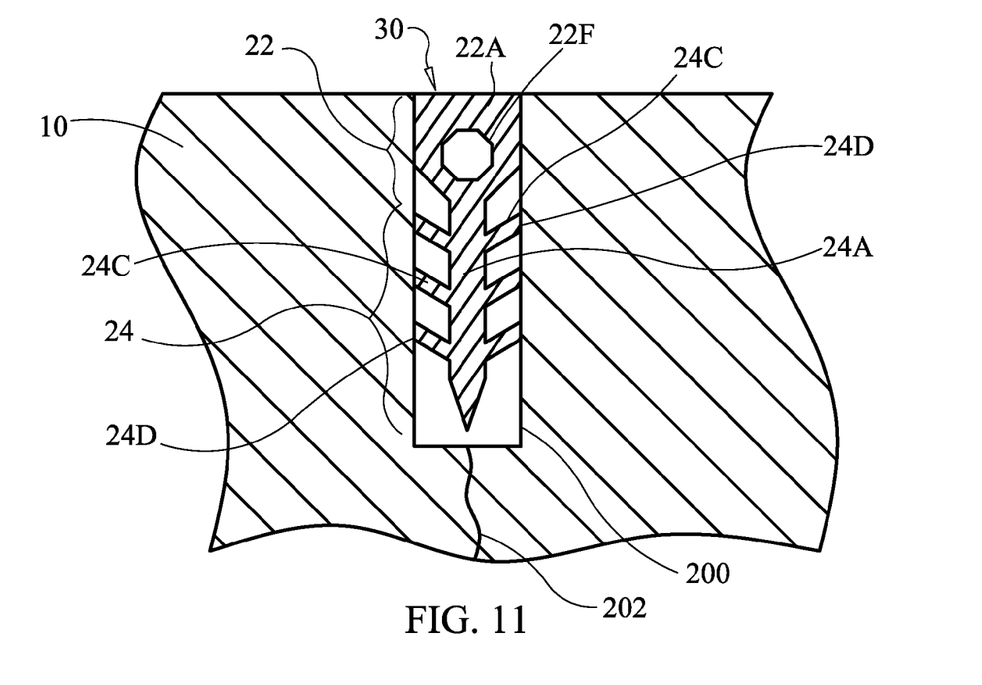
FIG. 11 is a cross-sectional view of a portion of an integrated concrete slab with a surface sawcut filled with the joint filling strip illustrated in FIG. 8.

A portion of a completed concrete floor system in accordance with another embodiment of the present invention is shown in FIG. 11 where integrated concrete slab 10 has sawcut 200 with joint filling strip 30 inserted therein. In this embodiment, hole 22F allows constant width portion 22A to more readily experience small amounts of lateral compression/expansion to accommodate variations and/or expansion/contraction of the width of sawcut 200 during the life of slab 10.

Figure 12:
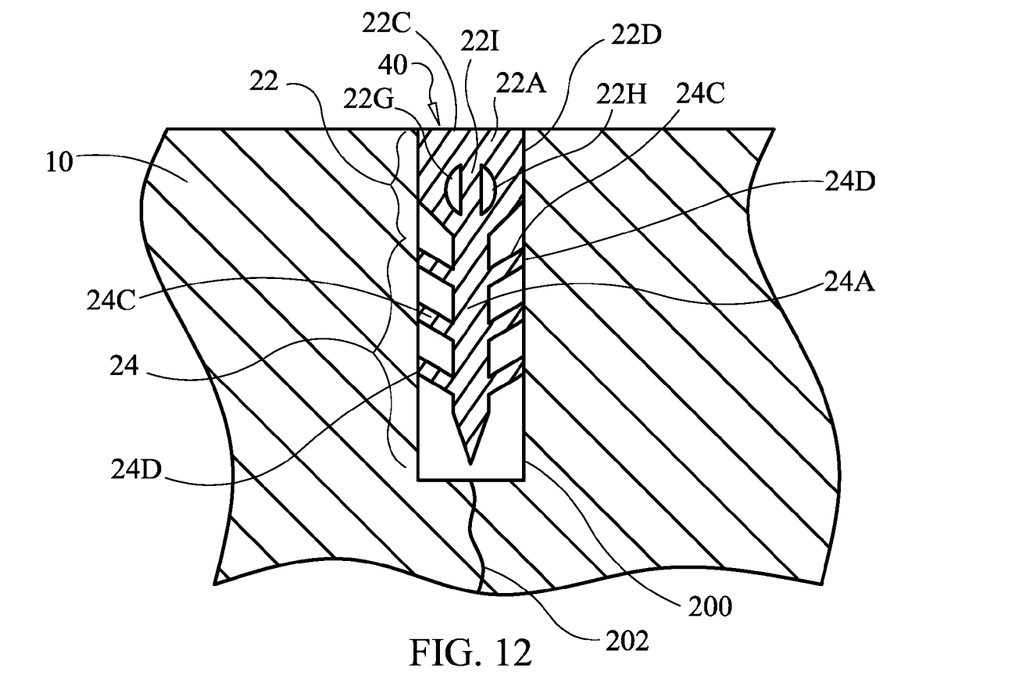
FIG. 12 is a cross-sectional view of a portion of an integrated concrete slab with a surface sawcut filled with the joint filling strip illustrated in FIG. 9.

A portion of a completed concrete floor system in accordance with another embodiment of the present invention is shown in FIG. 12 where integrated concrete slab 10 has sawcut 200 with joint filling strip 40 inserted therein. In this embodiment, holes 22G/22H allow constant width portion 22A to more readily experience small amounts of lateral compression/expansion to accommodate variations and/or expansion/contraction of the width of sawcut 200 during the life of slab 10. In addition, since vertical region 22I is perpendicular to top 22C and parallel to opposing sides 22D/22E, it provides support of constant width portion 22A when strip 40 is pounded into sawcut 200.

The advantages of the present invention are numerous. The joint filling strip provides an efficient means to fill sawcut "joints" in slabs or between slabs. No liquid adhesives or fillers are required to fill sawcuts thereby insuring an efficient and neat finishing process and finished product. In terms of concrete slab construction, the described joint filling strip will substantially reduce or eliminate spalling at sawcut "joints". The joint filling strip can also be used to fill elongated and open joints between other types of materials that can be the same or different on either side of the joint.

Figure 13:
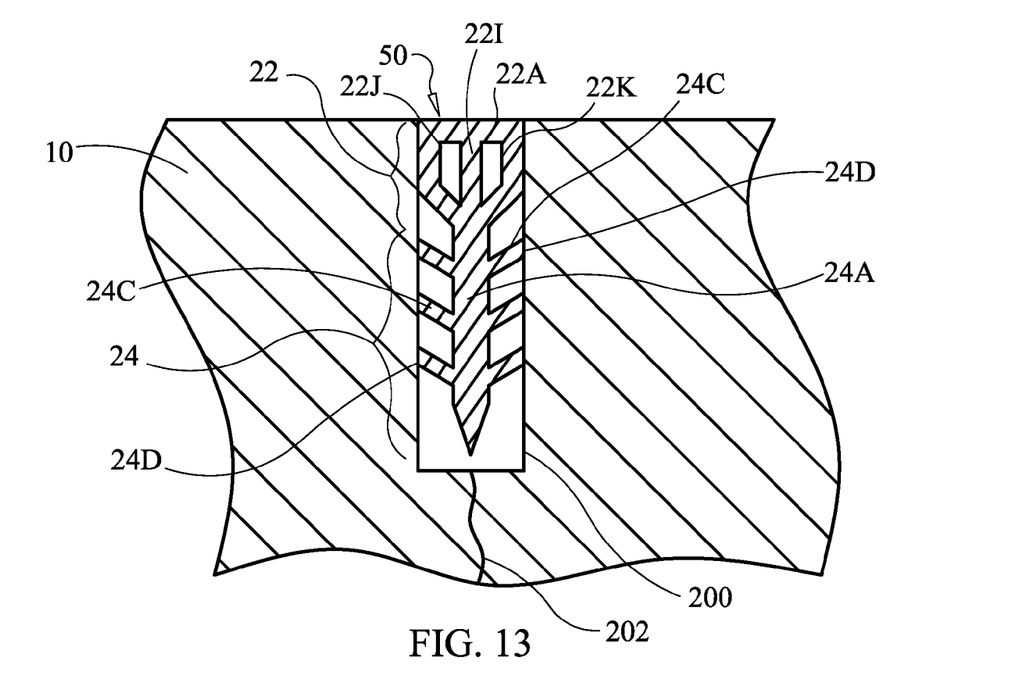
FIG. 13 is a cross-sectional view of yet another embodiment of a joint filling strip in its pre-use state.

Although the invention has been described relative to specific embodiments thereof, there are numerous variations and modifications that will be readily apparent to those skilled in the art in light of the above teachings. For example, FIG. 13 illustrates another embodiment of a joint filling strip in its pre-use state that is referenced generally by numeral 50. Strip 50 is similar to strip 40 and is, therefore, labeled with reference numerals to identify structural elements that strip 50 has in common with strip 40. The common structural elements will not be described again herein. Strip 50 has holes 22J and 22K that are mirror images of one another relative to vertical region 22I. Further, the outer edges of each hole 22J/22K are parallel to the adjacent outer edges of top portion 22. Shaping of holes 22J/22K in this fashion will facilitate lateral compression/expansion of top portion 22 during strip insertion and during contraction/expansion of a sawcut having strip 50 disposed therein.

Each of the above-described joint filling strips is not limited to use in the integrated concrete slab described herein. That is, in general, any of the joint filling strips described herein can be used to fill a sawcut/joint in any concrete slab or an elongated open joint in any construction surface. The strips can be pre-made in a factory or extruded on site. It is therefore to be understood that the invention may be practiced other than as specifically described.

What is claimed as new and desired to be secured by Letters Patent of the United States is:

1. A joint filling strip, comprising a strip of uniform cross-section along its length, said uniform cross-section defining a top portion and a shaft portion coupled to said top portion, said top portion including a rectangular section defining parallel outermost sidewalls, said shaft portion including a central support and at least one pair of opposing fins extending perpendicularly away from either side of said central support, each of said fins having a wedge-shaped tip, said shaft portion to include said central support and said opposing fins spanning a lateral distance that is of a width greater than a width of said rectangular section, wherein said top portion includes a pair of holes extending along said length of said strip.

2. A joint filling strip as in claim 1, wherein said holes are separated by a region of said rectangular section, said region being parallel to side walls of said rectangular section.

3. A joint filling strip as in claim 1, wherein each of said holes includes edges running parallel to edges of said rectangular section.

4. A joint filling strip as in claim 1, wherein said strip comprises a plastic material.

5. A joint filling strip as in claim 1, wherein said central support terminates in a tapered tip.

6. A joint filling strip as in claim 1, wherein said central support is aligned with a center of said top portion.

7. A joint filling strip, comprising a strip of a plastic material, said strip being of uniform cross-section along its length, said uniform cross-section defining a top portion and a shaft portion coupled to said top portion, said top portion including a rectangular section defining parallel outermost sidewalls and having a plurality of holes extending along a length of said strip, said shaft portion including a central support and at least one pair of opposing fins extending perpendicularly away from either side of said central support, each of said fins having a wedge-shaped tip, said shaft portion to include said central portion and said opposing fins spanning a lateral distance that is of a width greater than a width of said rectangular section.

8. A joint filling strip as in claim 7, wherein said said plurality of holes comprises a pair of holes separated by a region of said top portion, said region being parallel to side walls of said rectangular section.

9. A joint filling strip as in claim 8, wherein each of said holes includes edges running parallel to edges of said top portion.

10. A joint filling strip as in claim 7, wherein said central support terminates in a tapered tip.

11. A joint filling strip as in claim 7, wherein said central support is aligned with a center of said rectangular section.

\* \* \* \* \*